(12) United States Patent
Zhang (10) Patent No.: US 9,404,201 B2
(45) Date of Patent: Aug. 2, 2016

(54) METALLIC CARD WIRE

(71) Applicant: NV BEKAERT SA, Zwevegem (BE)

(72) Inventor: Yuning Zhang, Ghent (BE)

(73) Assignee: GROZ-BECKERT KG, Albstadt (DE)

( * ) Notice: Subject to any disclaimer, the term of this patent is extended or adjusted under 35 U.S.C. 154(b) by 0 days.

(21) Appl. No.: 14/354,421

(22) PCT Filed: Oct. 5, 2012

(86) PCT No.: PCT/EP2012/069686
§ 371 (c)(1),
(2) Date: Apr. 25, 2014

(87) PCT Pub. No.: WO2013/072136
PCT Pub. Date: May 23, 2013

(65) Prior Publication Data
US 2014/0259537 A1  Sep. 18, 2014

(30) Foreign Application Priority Data

Nov. 15, 2011  (EP) ..................................... 11189094

(51) Int. Cl.
*D01G 15/88* (2006.01)
*B23D 65/02* (2006.01)

(52) U.S. Cl.
CPC ................ *D01G 15/88* (2013.01); *B23D 65/02* (2013.01); *Y10T 83/9442* (2015.04)

(58) Field of Classification Search
CPC ....... D01G 15/84; D01G 15/88; B23D 65/02; B23D 65/04

USPC .............................................. 19/114; D15/78
See application file for complete search history.

(56) References Cited

U.S. PATENT DOCUMENTS

| 2,937,413 | A | * | 5/1960 | Hollingsworth | ................. | 19/114 |
| 4,651,387 | A | * | 3/1987 | Giuliani | ......................... | 19/113 |
| 4,653,152 | A | * | 3/1987 | Wada | ............................... | 19/114 |
| 4,964,195 | A | * | 10/1990 | Hollingsworth | ................ | 19/114 |
| 5,096,506 | A | * | 3/1992 | Hollingsworth | .............. | 148/598 |
| 5,581,848 | A | * | 12/1996 | Egerer | ............................ | 19/114 |

(Continued)

FOREIGN PATENT DOCUMENTS

| BE | 707281 | A | 4/1968 |
| CN | 201258379 | Y | 6/2009 |

(Continued)

OTHER PUBLICATIONS

International Search Report (ISR) dated Jan. 25, 2013, for PCT/EP2012/069686.
"Spinnovation", Issue No. 25, Aug. 2011.

*Primary Examiner* — Shaun R Hurley
(74) *Attorney, Agent, or Firm* — Bacon & Thomas, PLLC (57) ABSTRACT

A metallic card wire has an elongated rib portion and teeth. The teeth have a front segment, a top segment and a back segment. The front segment has the connection of the tooth from the elongated rib portion and the front segment including a tip which is actively taking fibers in carding. The top segment has at least one hunch after the tip in the direction of the back segment. If more than one hunch is present the first hunch is the hunch positioned closest to the tip; if only one hunch is present this hunch is the first hunch. The back segment forms the connection of the top segment towards the elongated rib portion and the front segment of the next tooth.

15 Claims, 7 Drawing Sheets

(56) References Cited

U.S. PATENT DOCUMENTS

| | | | | |
|---|---|---|---|---|
| 5,606,900 | A * | 3/1997 | Stoddard | 83/846 |
| 6,195,843 | B1 | 3/2001 | Graf | |
| 6,523,226 | B2 * | 2/2003 | Graf | 19/114 |
| 7,174,823 | B2 * | 2/2007 | Cranna | 83/848 |
| 7,325,278 | B2 * | 2/2008 | Bocht | 19/114 |
| D642,028 | S * | 7/2011 | Fosberg et al. | D8/20 |
| 8,113,100 | B1 * | 2/2012 | Cranna et al. | 83/851 |
| 8,590,110 | B2 * | 11/2013 | Iten et al. | 19/114 |

FOREIGN PATENT DOCUMENTS

| | | |
|---|---|---|
| EP | 1529859 A2 | 5/2005 |
| GB | 1258496 A | 12/1971 |
| JP | 50005626 A | 1/1975 |
| JP | 8074132 A | 3/1996 |
| WO | 03/087446 A2 | 10/2003 |

* cited by examiner

METALLIC CARD WIRE

BACKGROUND OF THE INVENTION

1. Technical Field

The invention relates to a card wire. The new card wire can e.g. be used on cylinders on revolving flat cards. Other applications include lickerin rollers on roller cards and on revolving flat cards as well as cylinders on roller cards. The invention describes a method to make such card wires as well.

2. Background Art

Figure 1:
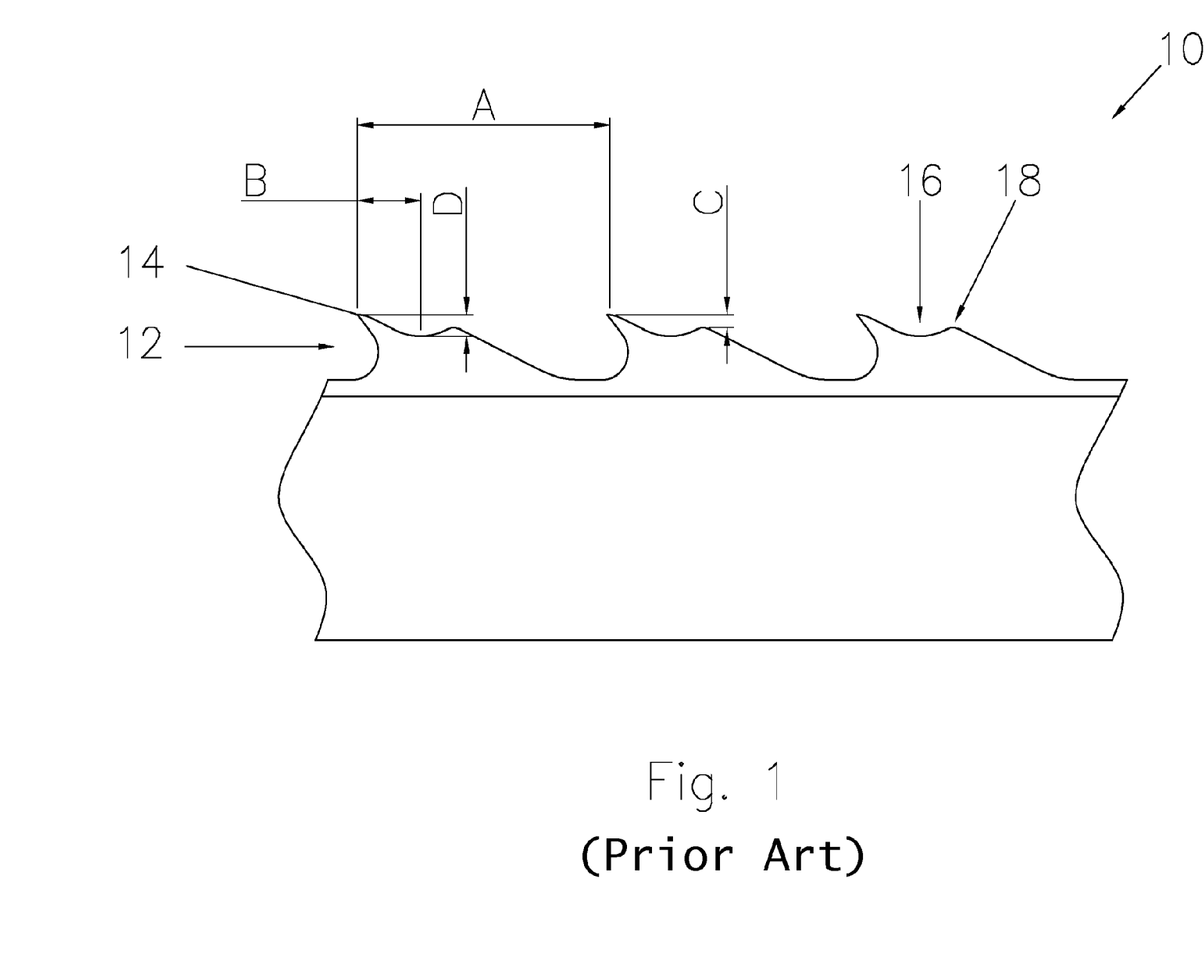
FIG. 1 shows a "camel type" wire of the prior art.

In issue No. 25 (August 2011) of the magazine "Spinnovation", a "camel type" card wire is proposed for use on cylinder and lickerin rollers of revolving flat cards. The tooth has a tip which has the traditional shape, and in addition to it one hump at the back of the tooth at a distance from the tip of the tooth and positioned considerably lower than the tip of the tooth. Such a wire is shown in FIG. 1. The claimed benefit of the camel shape is a positive effect on the airflow on the clothing surface. And as a result, the fibres are kept on the surface of the cylinder wire much better, thus preventing the fibres from sliding into the clothing. The closer positioning of the fibres to the revolving flats is said to enhance the carding process. After re-sharpening the tips of the "camel type" wire, the fibres will even be closer positioned to the revolving flats, further enhancing the carding process. The doffer on the card is said to take more fibres when using the "camel type" cylinder wire. Using the "camel type" wire on lickerin rollers is claimed to result in the improvement of fibre transfer between lickerin and cylinder as well as to increase extraction of trash, as trash and fibres are kept on the surface of the lickerin wire.

CN201258379Y describes a card wire with a traditional tip of the tooth. The wire is characterized in that it has a horizontal platform (meaning a platform parallel with the direction of the card wire) on the back of each tooth of the toothed part. The platform is positioned at a distance below the tip of the tooth. A transition zone is present between the tip of the tooth and the platform. An arc-shaped transition is provided between the platform and the bottom of the tooth. Due to the platform on the back of the tooth, the strength of the tooth tip is increased. Additionally, the platform can prevent fibres from sinking to the tooth bottom. By appropriately increasing the tooth pitch to increase the fibre-holding capacity, the tooth tip strength and the transfer capability are increased, thereby improving the carding effect and improving the yarn quality.

It is general practice to re-sharpen cylinder wires on revolving flat cards a number of times over their useful life. Re-sharpening restores the tooth to sharp leading edges, removing the rounding at the tip. However the creation of a flat surface at the tip of the wire cannot be avoided. This flat surface means that the tooth has lost sharpness compared to its initial state and hence that carding performance is reduced in that fibres can less easily be taken (e.g. from the revolving flats) by the teeth of the card wire. This will be the case in cylinder wires as described in CN201258379Y and in the "camel type" cylinder wire as it is in conventional cylinder wires.

It is another drawback of these wires that the platform (in CN201258379Y) or the one hump (in the "camel type" card wire) is at a distinctly lower position than the tip of the tooth. Hence, the distance between the wire and a corresponding carding surface (e.g. on a short staple card between the platform or hump on the one hand, and the revolving tops on the other hand), will be significantly higher than the distance between the tip of the tooth and the corresponding carding surface. This fact can cause a lot of fibre rolling instead of fibre carding and hence the undesirable creation of fibre neps.

SUMMARY OF THE INVENTION

It is the objective of the invention to provide metallic card wires with improved performance, and especially metallic card wires that are not showing the drawbacks of metallic card wires of the prior art.

It is a specific objective of the invention to provide a cylinder wire for revolving flat cards that has better ability than prior art cylinder wires to take fibres (e.g. from the tops) after being re-sharpened one or more times, resulting in improved carding performance.

According to a first aspect of the invention a metallic card wire is described that has an elongated rib portion and teeth. The teeth comprise a front segment, a top segment and a back segment. The front segment comprises the connection of the tooth from the elongated rib portion and the front segment includes a tip which is actively taking fibres in carding. The top segment comprises at least one hunch after the tip in the direction of the back segment. A hunch is defined as a rounded protuberance (definition as provided in Webster's Third New International Dictionary). If more than one hunch is present the first hunch is the hunch positioned closest to the tip; if only one hunch is present this hunch is the first hunch. The deepest point of the valley between the tip and the first hunch has a distance from the tip in the direction perpendicular to the length of the card wire of minimum 0.03 mm (and preferably less than 0.2 mm and more preferably less than 0.1 mm, and preferably less than 0.07 mm). The highest point—or the middle of the zone that is highest—of at least one of the hunches lies within the two fictitious lines through the tip of the card wire that make an angle of −5 degrees and of +3 degrees with the longitudinal direction of the card wire. More preferably within the fictitious lines that make angles of +2 degrees and −2 degrees, and most preferably within the fictitious lines that make angles of −1 degree and +1 degree with the longitudinal direction of the card wire. Within −1 and +1 degrees means that—within production tolerance—the height of the tip and of the considered hunch is the same. With a negative angle is meant that the highest point of the hunch is positioned (with respect to the base of the card wire) lower than the tip; with a positive angle is meant that the highest point of the hunch is positioned (with respect to the base of the card wire) higher than the tip of the card wire. The back segment forms the connection between the top segment towards the elongated rib portion and the front segment of the next tooth.

Preferably, the first hunch, has in the hunch a minimum radius of curvature of more than 0.1 mm, resulting in it that the card wire can be manufactured more easily, for instance because of lower tool wear when punching the wire and easier to produce tool shapes dimensions. Such card wire has synergetic functional benefits, as it avoids to have a too aggressive card wire, which could break fibres, reducing the quality of the fibre web of fibre sliver produced on the card.

According to a second aspect of the invention a metallic card wire is described that has an elongated rib portion and teeth. The teeth comprise a front segment, a top segment and a back segment. The front segment comprises the connection of the tooth from the elongated rib portion and the front segment includes a tip which is actively taking fibres in carding. The top segment comprises at least one flattened hunch after the tip in the direction of the back segment. With a flattened hunch is meant a rounded protuberance that has at its top a flat section, called a flat land. If more than one flattened hunch is present the first flattened hunch is the flattened hunch positioned closest to the tip; if only one flattened hunch is present this flattened hunch is the first flattened hunch The middle of the flat land of the first flattened hunch lies within the two fictitious lines through the tip of the card wire that make an angle of −5 degrees and of +3 degrees with the longitudinal direction of the card wire. Preferably the middle of the flat land of the first flattened hunch lies within the two fictitious lines through the tip of the card wire that make an angle of +2 degrees and −2 degrees (and most preferably +1 degree and −1 degree)—with the longitudinal direction of the card wire. A valley is located on the top segment between the tip and the first flattened hunch. The back segment is forming the connection between the top segment towards the elongated rib portion and the front segment of the next tooth.

A card wire according to the second aspect of the invention can be made as a new wire, but can also originate from a card wire according to the first aspect of the invention after re-sharpening such card wire on the card. In such re-sharpening a hunch as in a card wire of the first aspect of the invention is transformed into a flattened hunch as in the second aspect of the invention. It is clear that when re-sharpening a card wire according to the first aspect of the invention, the depth of the valley(s) will be reduced.

It is a benefit of card wires according to the first and to the second aspect of the invention that because of the high positioning of the first hunch (or of the first flattened hunch), the problem of fibre rolling, e.g. rolling fibres into neps, is avoided. The effect is better, the less difference in height between the tip and the first hunch (or the first flattened hunch), meaning that the distance between the tip and the highest point of the first hunch (or of the first flattened hunch, highest point which is then in the flat land) is minimal, preferably zero within production tolerances. Or expressed differently, the result is better, the smaller the angle with the longitudinal direction of the card wire of the fictitious line that is connecting the tip with the highest point of the first hunch (or with the middle of the flat land of the first flattened hunch). The result is a better web or sliver quality, lower number of neps, when using such card wires. The presence of a valley between the tip and first hunch (or first flattened hunch) results in a better fibre penetration of the tip into fibre tufts.

In preferred embodiments of the first and second aspects of the invention, along the full length of the back segment the angle between the back segment and the length direction of the card wire is smaller than the front angle (the front angle is the angle of the tangent to the front segment at the tip of the tooth with the length direction of the card wire). The values for the back angle adds to the benefits in a synergetic way: it helps to release fibres to a next roller or to the flats of a flat revolving card, improving carding performance. Hence, carding efficiency is improved, in terms of quality of the sliver or the web that is produced: reduced number of neps.

It is a further benefit of metallic card wires according to the invention that when the teeth are re-sharpened on the card, not only the tip is re-sharpened but the first hunch or first flattened hunch (and in specific embodiments of the invention also some or all other hunches or flattened hunches) are touched by the grinding device. The result is that the hunch is flattened (a flat land is formed on the hunch) to form a flattened hunch or that the flat land—that is present in the flattened hunch as in the second aspect of the invention—is increased with the generation of a leading edge at the beginning of this flat land. The leading edge is having a contributing effect in carding, in that it contributes in an increase of the capability of retaining or even capturing fibres, e.g. retaining fibres or even taking fibres from the revolving flats (or tops) onto the cylinder wire on revolving flat cards. This way, a compensation is created for the loss of sharpness of the tip of the tooth after re-sharpening (due to the formation of a flat surface on the tip of the teeth) compared to the original state of the card wire. The grinding operation also creates scratches over the thickness of the wire on the flat land(s) that is or that are created. The scratches create additional opportunities for fibres to be taken or retained, and hence carding efficiency is improved.

Depending on the re-sharpening technology that is being used, typically in each re-sharpening operation about 0.005 to 0.02 mm is taken off from the tip of the card wire.

It is an additional benefit of metallic card wires according to the invention that fibres and trash particles are kept high on the card wire, contributing to effective carding. The presence of the hunches or flattened hunches, and their dimensions (especially the undeep valleys) creates additional surface at the tip of the card wire onto which the fibres can stay by means of friction and by means of geometrical blocking, without the fibres going too deep into the wire. A better carding is the result as fibres are more easily taken by the tops and the doffer. Trash removal at revolving flats or at mote knives is facilitated as trash particles can first lodge in the valleys without need to go deep in the wire, and will be ejected more easily, reducing the amount of trash in the sliver in cotton carding.

In a preferred embodiment of card wires according to the first or to the second aspect of the invention the valley located between the tip and the first hunch or the first flattened hunch has a distance from the tip in the direction perpendicular to the length of the card wire of less than 0.15 mm, and preferably of less than 0.10 mm and more preferably of less than 0.05 mm.

Taking into account that incoming fibre material in the main carding zone on revolving flat cards (which is the zone of main interaction between cylinder wires and revolving flats) is consisting out of about 60%-70% single fibres plus some entangled fibres and small tufts, a depth of the valley as selected (and especially with a depth of valley of 0.03-0.07 mm) is about two or three times the diameter of cotton fibres. The preferred value for the depth of the valley is 0.05 mm, because it is the optimum to "trap" fibres. A valley that is too deep could result in fibres that get stuck in the valley. A valley that is too shallow would mean that the geometrical and frictional blocking effect is reduced, reducing the functionality of the hunches or of the flattened hunches in carding.

In preferred embodiments of card wires according to the first or to the second aspect of the invention, the distance in the direction of the length of the card wire between the tip and the first hunch or between the tip and the middle of the land of the first flattened hunch is less than 17% (and preferably less than 15% of the pitch of the teeth, and preferably more than 10% of the pitch of the teeth. It is a benefit of this feature that the tip and the hunch or the tip and the flattened hunch can each act in an effective way with the different tips of the tops in revolving flat cards, resulting in effective carding.

In preferred embodiments of card wires according to the first or to the second aspect of the invention, the teeth of the card wire are leaning forward in one direction along the length of the card wire. Such card wires have as benefit that fibres are more easily released, e.g. to a doffer roller.

In preferred embodiments of card wires according to the first or to the second aspect of the invention, the card wires are made by means of rotary punching. It includes that the wire design has no technical limitations that would make it technically impossible to be produced using rotary punching. With rotary punching is meant the punching technology as e.g. described in U.S. Pat. No. 6,195,843 (whether using constant pitch or variable pitch, whichever mechanism used to set the pitch, e.g. in the way as described as state of the art technology in U.S. Pat. No. 6,195,843), document hereby included by reference. Rotary punching is a punching technique which is far more economical than vertical punching, the latter can obviously be used as well to manufacture card wires according to the invention. In a specific way of rotary punching that can be used to make card wires according to the invention, a strip of profiled wire is fed continuously at a constant linear speed through a punching head. The punching head is comprising one or more knives. The punching head is rotating with a constant speed wherein the knives are cutting subsequent teeth in the strip of profiled wire. This way, card wires according to the invention can be made in a very economical way.

Card wires according to the first aspect of the invention can have more than one hunch in the top segment (e.g. more than one hunch, e.g. more than two hunches, e.g. two hunches, e.g. three hunches, e.g. four hunches, e.g. five hunches), each of the hunches can have equal dimensions or the hunches can differ in dimensions. More than one hunch is preferred, as additional hunches contribute further to the listed functional effects. The different hunches create synergetic effects in improving carding results.

Card wires according to the second aspect of the invention can have more than one flattened hunch in the top segment (e.g. more than one flattened hunch, e.g. more than two flattened hunches, e.g. two flattened hunches, e.g. three flattened hunches, e.g. four flattened hunches, e.g. five flattened hunches), each of the flattened hunches can have equal dimensions or the flattened hunches can differ in dimensions. More than one flattened hunch is preferred, as additional flattened hunches contribute further to the listed functional effects. The different flattened hunches create synergetic effects in improving carding results.

Preferably, there are two or three hunches or flattened hunches, as tooth pitch (the distance along the card wire between two consecutive tips) and space of the top segment allow to have two or three hunches or flattened hunches and corresponding valleys of suitable sizes for optimum functionally in carding.

Most preferred however are two hunches or two flattened hunches as such card wires provide excellent performance (even better performance than card wires with one hunch or with one flattened hunch) and can be more easily designed and manufactured than card wires with three or more hunches or flattened hunches.

In a specific embodiment, the card wire according to the first or to the second aspect of the invention is having an included angle at the tip of maximum 30 degrees, preferable of maximum 25 degrees, more preferably of maximum 22 degrees. With included angle at the tip is meant the angle between the tangent at the tip at the front of the tooth and the tangent at the tip towards the back of the tooth. A benefit of a lower included angle is that the penetration of the into fibre bundles is improved, and hence, carding is facilitated, especially in synergy with the features of the card wires according to the invention.

The tip of the tooth can be cut point or can be of semi-aquiline shape or can have a flat land or can be rounded off.

With cut point is meant that the first part of the top segment, starting from the tip backwards is a straight line.

With semi-aquiline shape is meant that the first part of the top segment, starting from the tip backwards is a curved section, with a tangent at the tip in the direction of the top segment with a negative angle with respect to the length direction of the card wire.

In an embodiment of the invention the card wire according to the first or to the second aspect of the invention has a height of less than 5.5 mm. With height of the card wire—as is known by the person skilled in the art, is meant the distance perpendicular to the length direction of the card wire between the bottom of the wire and the tip. Such a card wire is well suited as lickerin wire; for use on lickerin rollers on roller cards or on revolving flat cards.

In another specific embodiment of the invention, the metallic card wire according to the first or second aspect of the invention has a height of less than 3 mm; preferably less than 2.5 mm, more preferably less than 2.0 mm. Such wires are ideally suited as cylinder wire, for use on cylinder rollers, e.g. of revolving flat cards or of roller cards.

In a preferred execution of the invention the front angle (which is the angle of the tangent to the front segment at the tip of the tooth with the length direction of the card wire) is between 40 and 80 degrees, preferably between 40 and 60 degrees, more preferably between 40 and 55 degrees, such wires are ideally suited for cylinders on revolving flat cards, especially for carding cotton. Another preferred range is between 65 and 75 degrees, such wires are ideally suited for cylinders on roller cards, e.g. for non-woven applications; and for cylinders for revolving flat cards for carding synthetic fibres such as viscose (rayon) and polyester.

The third aspect of the invention is the use of a metallic card wire as described in the first or in the second aspect of the invention on a cylinder roller or on a lickerin roller of a card, e.g. of a revolving flat card or of a roller card.

Another aspect of the invention is a lickerin roller or a cylinder roller of a revolving flat card or of a roller card comprising a card wire as in the first or as in the second aspect of the invention.

Features and elements of the different embodiments and examples of the invention can and may be combined while staying within the scope of the invention.

DETAILED DESCRIPTION OF THE INVENTION

FIG. 1 shows a camel type wire 10 according to the prior art. The card wire has a front segment 12 with a tip 14. The wire has at its top segment a valley 16 followed by a hump 18. In an example the card wire has a pitch A of 1.70 mm, a distance along the length direction of the wire B between the tip and the hump of 0.3878 mm. The vertical distance C between the hump and the tip is 0.08 mm. The vertical distance D between the valley and the tip is 0.65 mm.

FIGS. 2-5 show examples of card wires according to the first aspect of the invention. The card wires of these examples can be made using rotary punching, but can also be made via vertical punching.

Figure 2:
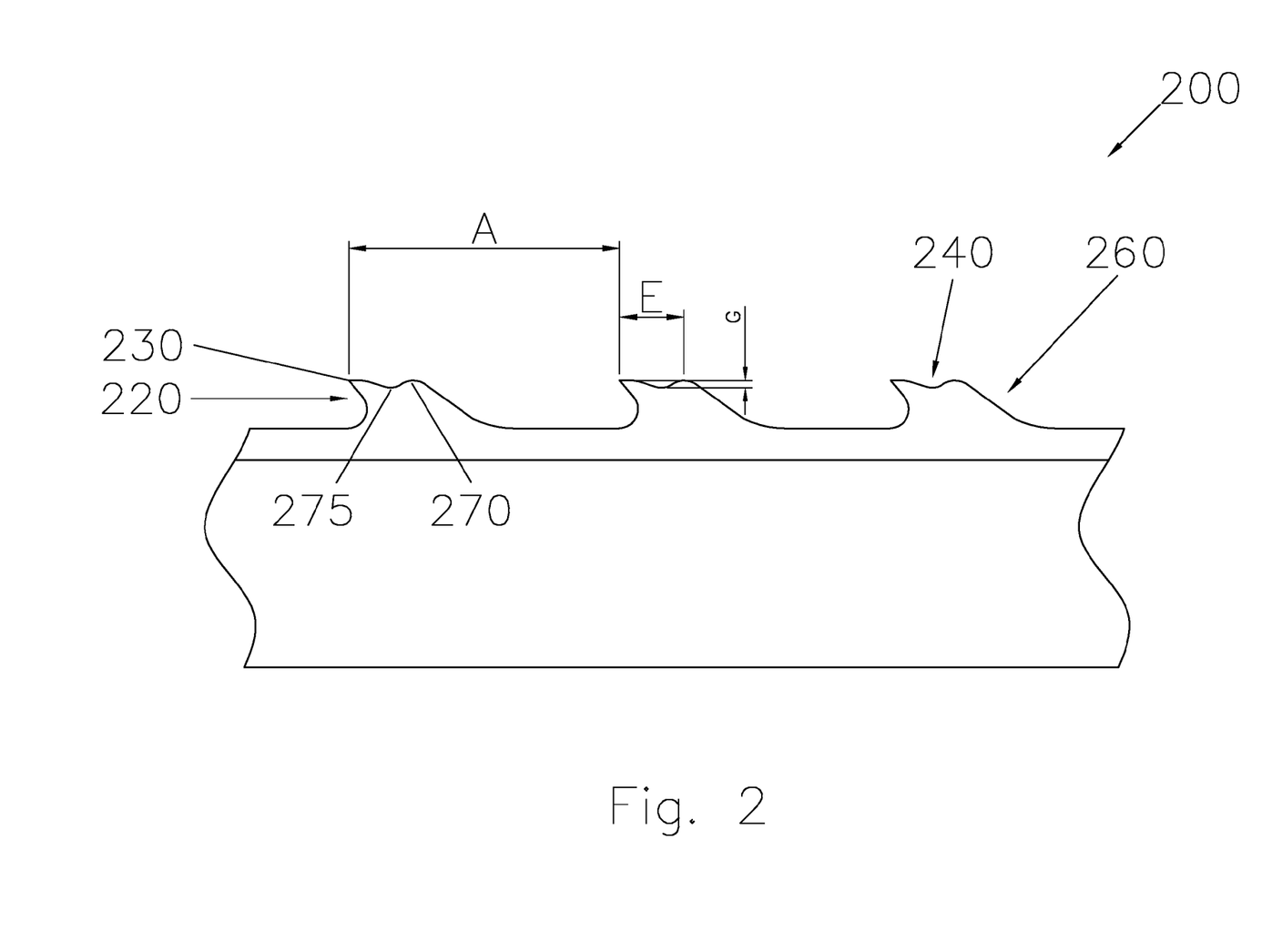
FIG. 2 shows according to the invention a metallic card wire with one hunch in the top segment.

FIG. 2 shows a metallic card wire 200 according to the first aspect of the invention and with one hunch in the top segment. The card wire has a front segment 220 (with a tip 230) and a top segment 240 and a back segment 260. The top segment 240 comprises one hunch 270 and a valley 275. In an example the card wire has a pitch A of 1.70 mm. The distance E in longitudinal direction of the card wire between the tip 230 and the hunch 270 (meaning with the highest point of the hunch) is e.g. 0.4034 mm. The tip 230 and the highest point of the hunch 270 are at the same height with respect of the length of the card wire, which means that the fictitious line that connects the tip 230 of the card wire with the highest point of the hunch 270 is parallel (making an angle of 0 degrees) with the length direction of the card wire. In the example, the hunch has in the hunch a smallest radius of curvature of 0.12 mm. In the example, the distance G, which is the distance in the direction perpendicular to the length of the card wire between the deepest point of the valley 275 and the tip of the card wire is 0.05 mm. The card wire has a front angle (measured at the tip between the front segment and the length direction of the card wire) of 50°.

Figure 3:
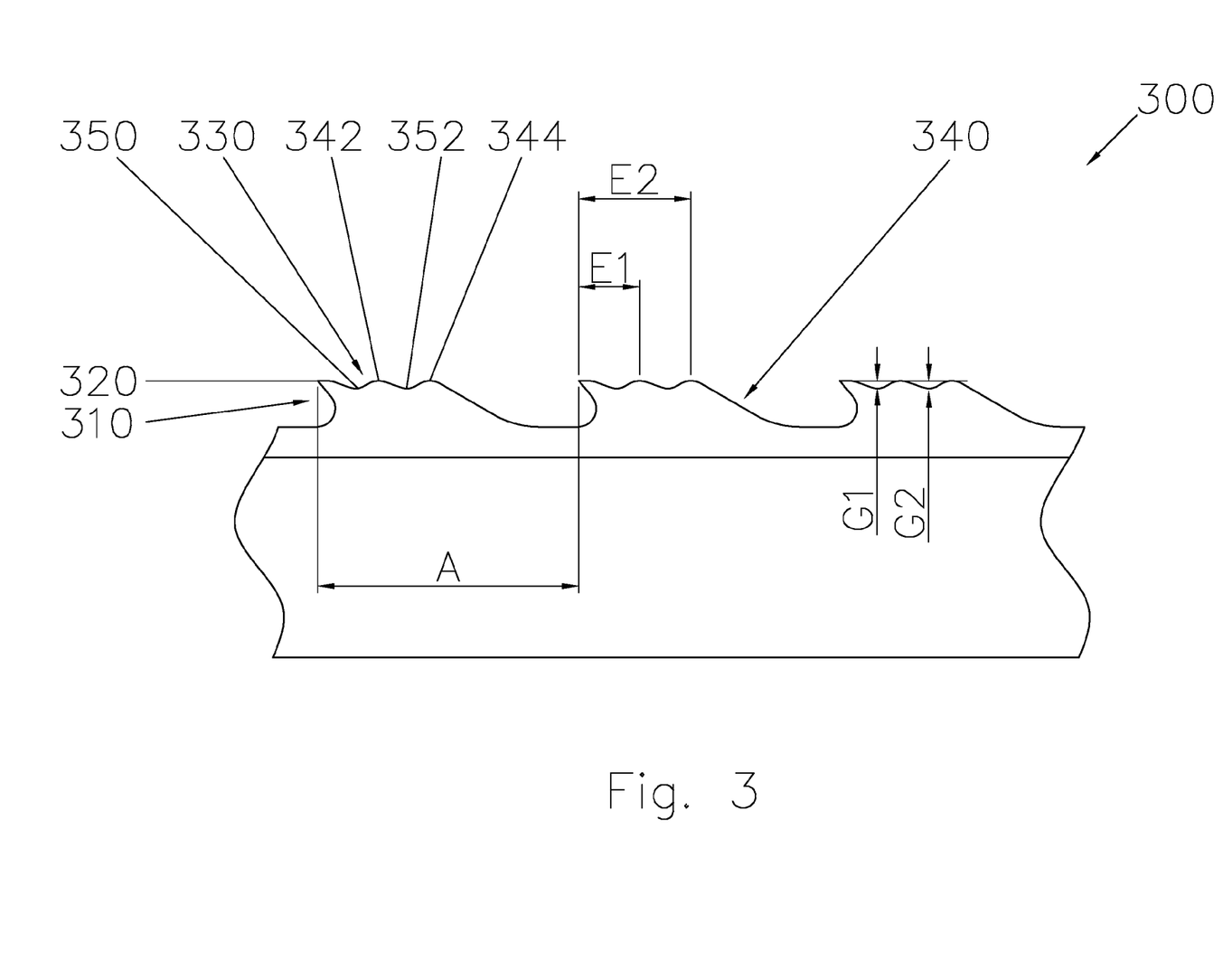
FIG. 3 shows according to the invention a metallic card wire with two hunches in the top segment.

FIG. 3 shows another metallic card wire 300 according to the invention. The card wire has a front segment 310 with a tip 320, a top segment 330 and a back segment 340. The top segment comprises two hunches (342, 344) and two valleys (350, 352). In an example the pitch A of the teeth is 1.70 mm. The distance E1 along the length of the card wire between the tip 320 and the first hunch 342 (meaning distance to the highest point of the hunch) is e.g. 0.245 mm. The distance E2 along the length of the card wire between the tip 320 and the second hunch 344 (meaning to the highest point of the hunch) is e.g. 0.579 mm. The tip 320 and the highest point of both hunches 342 and 344 are at the same height with respect of the length of the card wire. The fictitious line that connects the tip 320 of the card wire with the highest point of the first hunch 342 is parallel (making an angle of 0 degrees) with the length direction of the card wire. The fictitious line that connects the tip 320 of the card wire with the highest point of the second hunch 344 is also parallel (making an angle of 0 degrees) with the length direction of the card wire. The distance G1 perpendicular to the length of the card wire between the deepest point of the first valley 350 and the tip 320 of the card wire is e.g. 0.05 mm. The distance G2 perpendicular to the length of the card wire between the deepest point of the second valley 352 and the tip 320 of the card wire is e.g. 0.065 mm. In the example, the hunches have in the hunches a smallest radius of curvature of e.g. 0.12 mm. The card wire has a front angle (measured at the tip between the front segment and the length direction of the card wire) of e.g. 50°.

Figure 4:
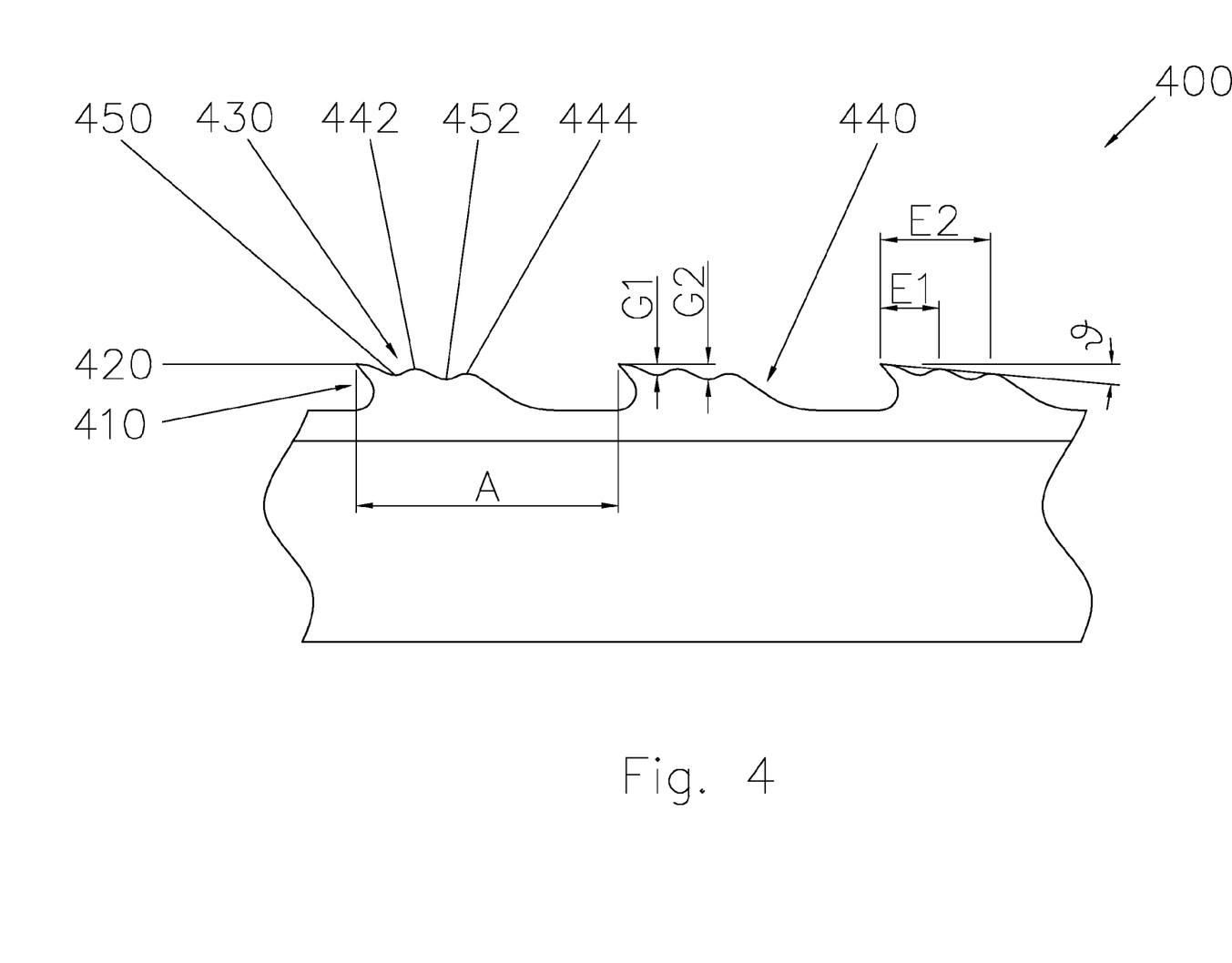
FIG. 4 shows another metallic card wire according to the invention with two hunches in the top segment.

FIG. 4 shows another metallic card wire 400 according to the invention. The card wire has a front segment 410 with a tip 420, a top segment 430 and a back segment 440. The top segment comprises two hunches (442, 444) and two valleys (450, 452). In this example the pitch A of the teeth is e.g. 1.70 mm. The distance E1 along the length of the card wire between the tip 420 and the first hunch 442 (meaning distance to the highest point of the hunch) is e.g. 0.38 mm. The distance E2 along the length of the card wire between the tip 420 and the second hunch 444 (meaning distance to the highest point of the hunch) is e.g. 0.71 mm. The fictitious line that connects the tip 420 of the card wire with the highest point of the first hunch 442 is making an angle theta (θ) of e.g. −5 degrees) with the length direction of the card wire. The fictitious line that connects the tip 420 of the card wire with the highest point of the second hunch 444 is also making an angle theta (θ) of e.g. −5 degrees with the length direction of the card wire. The distance G1 perpendicular to the length of the card wire between the deepest point of the first valley 450 and the tip 420 of the card wire is e.g. 0.0715 mm. The distance G2 perpendicular to the length of the card wire between the deepest point of the second valley 452 and the tip 420 of the card wire is e.g. 0.1 mm. In the example, the hunches have in the hunches a smallest radius of curvature of e.g. 0.12 mm. The card wire has a front angle (measured at the tip between the front segment and the length direction of the card wire) of e.g. 50°.

Figure 5:
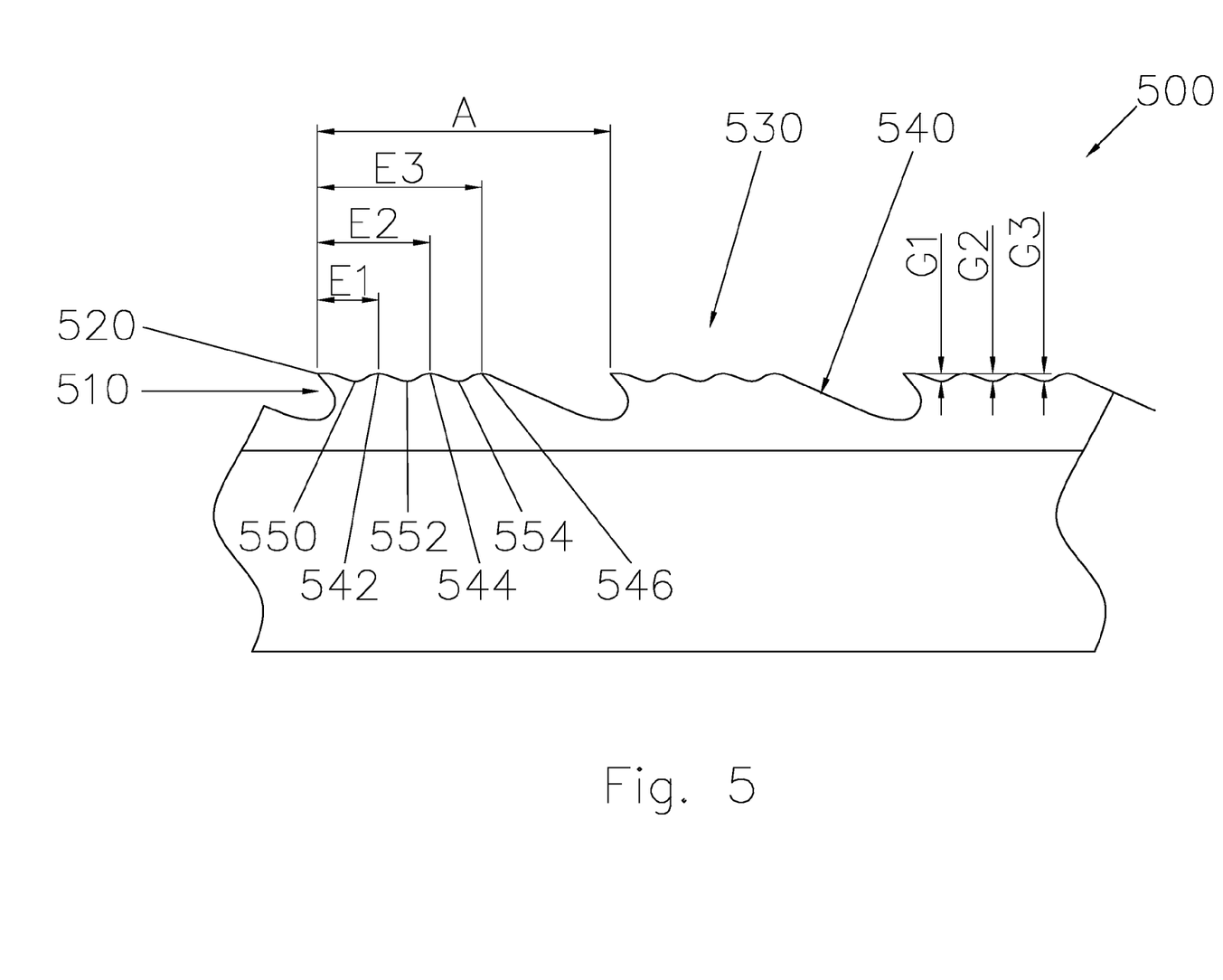
FIG. 5 shows a metallic card wire according to the invention with three hunches in the top segment.

FIG. 5 shows a card wire according to the invention that has three hunches in the top segment. The card wire 500 has a front segment 510 with a tip 520, a top segment 530 and a back segment 540. The top segment comprises three hunches (542, 544, 546) and three valleys (550, 552, 554). In this example the pitch A of the teeth is e.g. 1.90 mm. The distance E1 along the length of the card wire between the tip 520 and the first hunch 542 is e.g. 0.40 mm. The distance E2 along the length of the card wire between the tip 520 and the second hunch 544 is e.g. 0.73 mm. The distance E3 along the length of the card wire between the tip 520 and the third hunch 546 is e.g. 1.07 mm. In this example the tip, the first hunch 542, the second hunch 544 and the third hunch 544 are all at the same height (within production tolerances) with respect to the length direction of the card wire. This means that the angle of the fictitious line that connects the tip with the highest point of each of the hunches is making an angle of 0 degrees with the length direction of the card wire. The distance G1 perpendicular to the length of the card wire between the deepest point of the first valley 550 and the tip 520 of the card wire is e.g. 0.05 mm. The distance G2 perpendicular to the length of the card wire between the deepest point of the second valley 552 and the tip 520 of the card wire is e.g. 0.05 mm. The distance G3 perpendicular to the length of the card wire between the deepest point of the second valley 554 and the tip 520 of the card wire is e.g. 0.05 mm. In the example, the hunches have in the hunches a smallest radius of curvature of e.g. 0.12 mm. The card wire has a front angle (measured at the tip between the front segment and the length direction of the card wire) of e.g. 50°.

Figure 6:
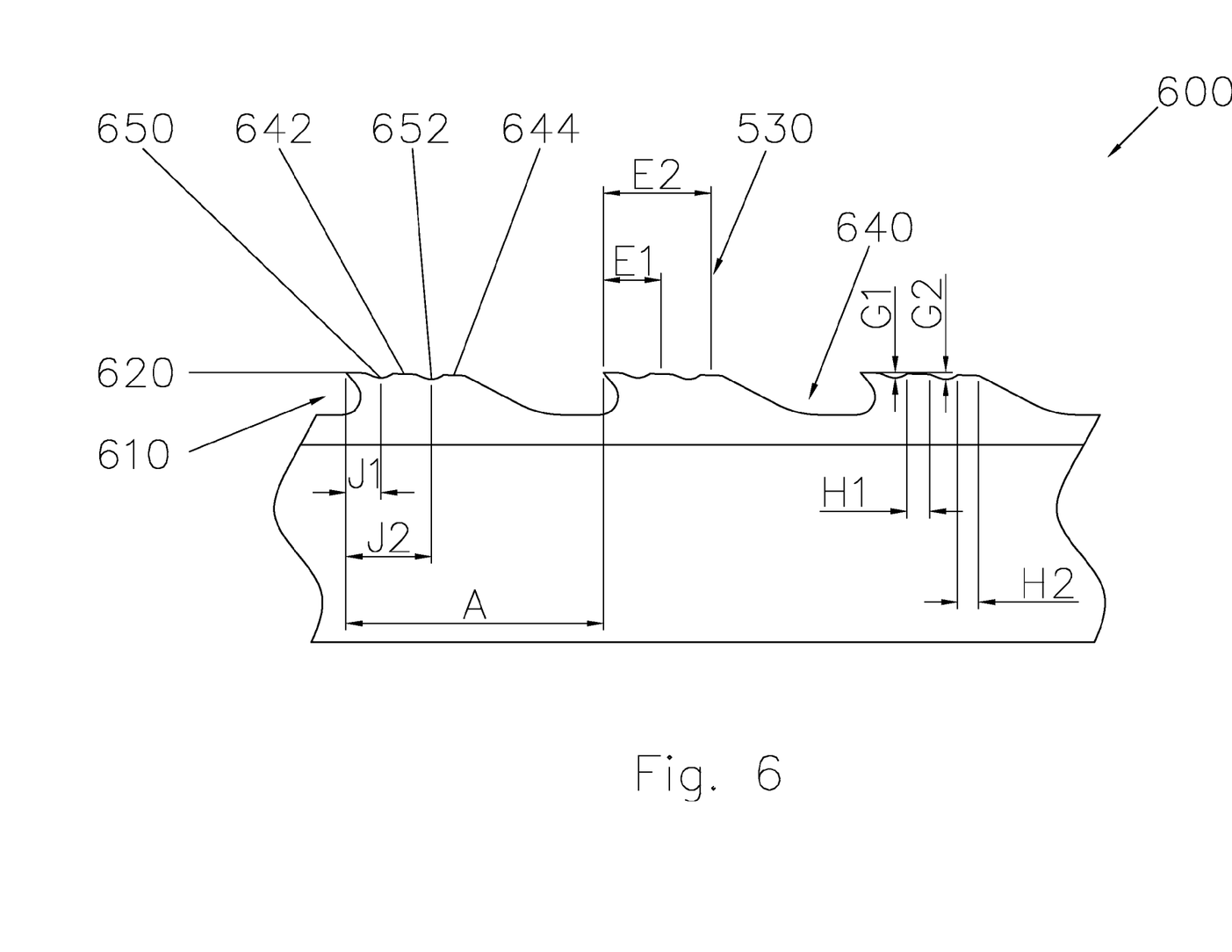
FIG. 6 shows a metallic card wire according to the second aspect of the invention with two flattened hunches.

FIG. 6 shows a card wire 600 with two flattened hunches according to the second aspect of the invention. The card wire has a front segment 610 with a tip 620, a top segment 630 and a back segment 640. The top segment 630 of the wire has two flattened hunches 642 and 644 and two valleys, 650 and 652. The first valley 650 is located between the tip 620 and the first flattened hunch 642, the second valley is located between the tip 620 and the second flattened hunch 644. In the example, the pitch A of the card wire is e.g. 1.70 mm. The distance G1 perpendicular to the length of the card wire between the deepest point of the first valley 650 and the tip 620 of the card wire is e.g. 0.036 mm. The distance G2 perpendicular to the length of the card wire between the deepest point of the second valley 652 and the tip 620 of the card wire is e.g. 0.045 mm. The distance J1 along the length of the card wire between the tip 620 and the deepest point of the first valley 650 is e.g. 0.23 mm. The distance J2 along the length of the card wire between the tip 620 and the deepest point of the second valley 652 is e.g. 0.564 mm. The first flattened hunch 642 has a flat H1 of 0.15 mm at the top, The second flattened hunch 644 has a flat H2 of 0.14 mm at the top. The distance E1 between the tip 620 and the middle of the first flattened hunch 642 is e.g. 0.38 mm. The distance E2 between the tip 620 and the middle of the second flattened hunch 644 is e.g. 0.71 mm. A wire as in this example can be made as a new wire, but the flat land (of the flattened hunches) can also be the result of wear and re-sharpening on the card of card wires according to the first aspect of the invention.

Figure 7A:
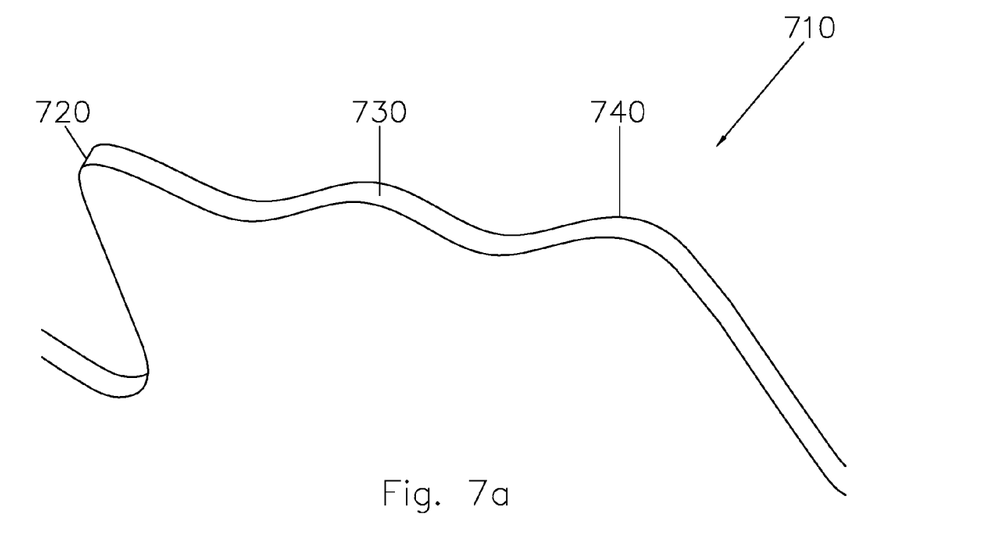
FIG. 7 shows the effect of wear and of re-sharpening on metallic card wires according to the invention.

FIG. 7 shows the effect of wear and of re-sharpening on metallic card wires according to the invention. FIG. 7A shows the profile of a tooth 710 of a card wire according to the invention that has been subject to wear due to normal use on the card. The exemplary tooth 710 has a tip 720 and two hunches 730 and 740 which are all (further) rounded off by the effect of the wear.

Figure 7B:
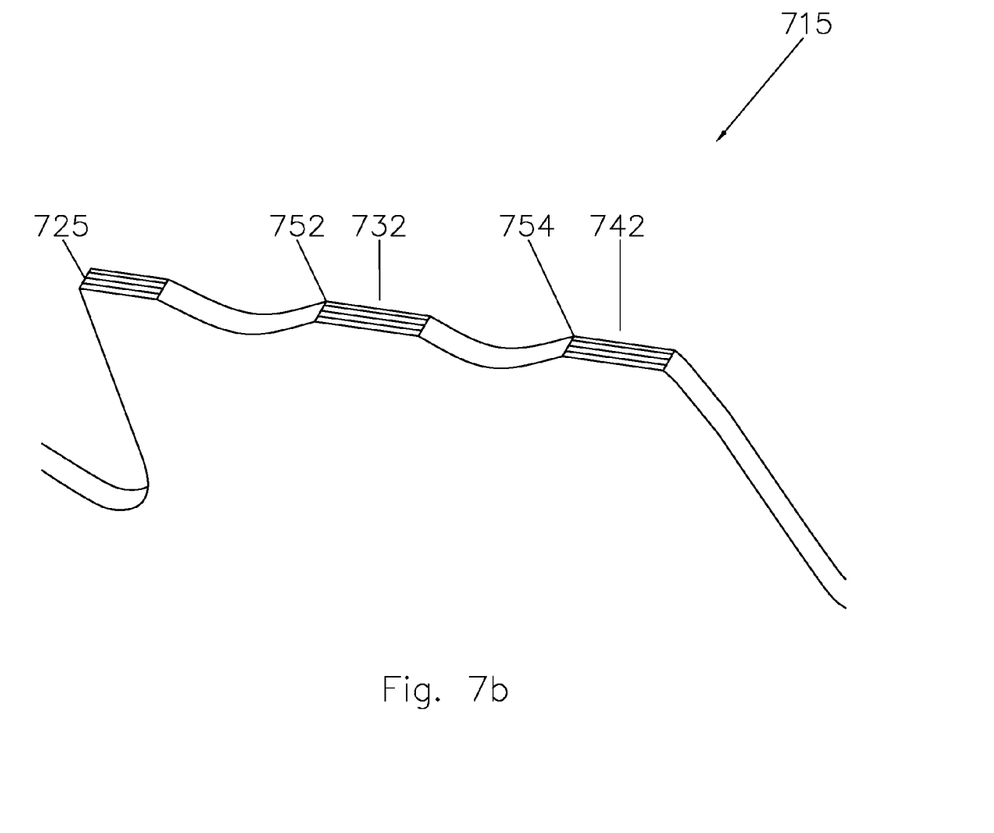

FIG. 7B shows the effect of re-sharpening the teeth of the card wire e.g. by means of techniques known in the art. A sharp edge of the tip of the tooth 725 (see FIG. 7B) is restored. An effect of the re-sharpening is that a flat land is created on the first hunch, resulting in a flattened hunch 732 and possibly also on further hunches (here also on the second hunch, resulting in a flattened hunch 742). A further effect is that the flat land created at the tip 725, the land at the first flattened hunch 732 (and if present also at lands of further flattened hunches, here at the second flattened hunch 742) are showing scratches (indicated by hatchings at FIG. 7B) that are beneficial to capture and retain fibres on the tooth of the card wire. The re-sharpening is also creating a sharp leading edges 752, 754 at the start of the flat lands of the flattened hunches. The sharp leading edge—in combination with the scratches—is useful to increase carding performance.

In each of the examples shown in FIGS. 2 to 7, the teeth of the card wires are leaning forward in one direction along the length of the card wire.

A wire profile of the present invention can be made as follows. Starting product is a wire rod (usual diameters e.g. 1.20 mm or 7.0 mm) with a steel composition along the following lines: carbon content ranging from 0.30% to 2.0%, e.g. from 0.5 to 1.2%; e.g. from 0.6 to 1.1%; silicon content ranging from 0.10% to 2.5%, e.g. from 0.15 to 1.60%; manganese content ranging from 0.10% to 2.0%, e.g. from 0.50 to 0.90%; chromium content ranging from 0.0% to 2.0%, e.g. from 0.10% to 1.50%; e.g. from 0.10% to 0.90%; vanadium content ranging from 0.0% to 2.0%, e.g. from 0.05% to 0.60%, e.g. from 0.10% to 0.50%; tungsten content ranging from 0.0% to 1.5%, e.g. from 0.1% to 0.70%. In one embodiment of the present invention, the composition of wire profile may contain either chromium or vanadium. In some other compositions both chromium and vanadium are present. The amounts of sulfur and phosphorous are preferably kept as low as possible, e.g. both below 0.05%, e.g. below 0.025%.

The wire rod is cold and dry drawn until the desired non-round profile is reached. Rolling can be carried out by means of Turks heads or by means of rolls. Drawing can be done by means of profile drawing dies. The profile depends upon the application can be square, rectangular, or take an L-form. The basis leg of the L forms the rib portion and the top leg of the L will house the eventual teeth. After this profiling, the teeth are formed in the profile wire by means of a cutting operation preferably a punching operation. The forming of the teeth may be followed by a deburring operation.

Thereafter the formed saw toothed wire profile is subjected to some heat treatments, which aim at stress-relieving the rib portion of the saw-toothed wire and at hardening the teeth. Therefore, the entire saw toothed wire is heated until a temperature of about 600° C. and the teeth get an additional heating until they reach a temperature of about 900° C. Thereafter the entire wire is quenched so that the foot is stress relieved and the teeth are hardened since the teeth are subjected to a much greater jump in temperature. The global heating until 600° C. can be done by means of induction heating or by means of a gas burner. The heating of the teeth until 900° C. can be done by means of an additional gas burner, or by passing the teeth through a plasma arc or torch. The quenching operation can be done in an oil bath or in a bath containing a polymer emulsion.

The invention claimed is:

1. A metallic card wire comprising an elongated rib portion and teeth,
    the teeth comprising a front segment, a top segment and a back segment,
    wherein the front segment comprises a connection of the tooth from the elongated rib portion and the front segment includes a tip which is actively taking fibres in carding,
    wherein the top segment comprises at least one hunch after the tip in the direction of the back segment, wherein if more than one hunch is present a first hunch is the hunch positioned closest to the tip and if only one hunch is present this hunch is the first hunch,
    wherein a deepest point of a valley between the tip and the first hunch has a distance from the tip in the direction perpendicular to a length of the card wire of minimum 0.03 mm,
    wherein a highest point—or a middle of the zone that is highest—of at least one of the hunches lies within two fictitious lines through the tip of the card wire that make an angle of −5 degrees and of +3 degrees with the longitudinal direction of the card wire, and
    wherein the back segment forms the connection of the top segment towards the elongated rib portion and the front segment of the next tooth,
    wherein along a full length of the back segment the angle between the back segment and the length direction of the card wire is smaller than a front angle.

2. The metallic card wire as in claim 1, wherein the first hunch, has in the hunch a minimum radius of curvature of more than 0.1 mm.

3. A metallic card wire comprising an elongated rib portion and teeth,
    the teeth comprising a front segment, a top segment and a back segment,
    wherein the front segment comprises a connection of the tooth from the elongated rib portion and the front segment includes a tip which is actively taking fibres in carding,
    wherein the top segment comprises at least one flattened hunch after the tip in the direction of the back segment, wherein if more than one flattened hunch is present a first flattened hunch is the flattened hunch positioned closest to the tip and if only one flattened hunch is present this flattened hunch is the first flattened hunch, wherein the top segment comprises a valley between the tip and the first flattened hunch, wherein a middle of a flat land of the first flattened hunch lies within two fictitious lines through the tip of the card wire that make an angle of −5 degrees and of +3 degrees with a longitudinal direction of the card wire, and
    wherein the back segment is forming the connection of the top segment towards the elongated rib portion and the front segment of the next tooth,
    wherein along a full length of the back segment the angle between the back segment and the length direction of the card wire is smaller than a front angle.

4. The metallic card wire as in claim 1, wherein the card wire is of such a design that it can be made by means of rotary punching.

5. The metallic card wire as in claim 3, wherein the card wire is of such a design that it can be made by means of rotary punching.

6. The metallic card wire as in claim 1, wherein the valley located between the tip and the first hunch has a distance from the tip in the direction perpendicular to the length of the card wire of less than 0.15 mm.

7. The metallic card wire as in claim 3, wherein the valley located between the tip and the first flattened hunch has a distance from the tip in the direction perpendicular to the length of the card wire of less than 0.15 mm.

8. The metallic card wire as in claim 1, wherein the distance in the direction of the length of the card wire between the tip and the first hunch is less than 17% of a pitch of the teeth.

9. The metallic card wire as in claim 3, wherein the distance in the direction of the length of the card wire between the tip and the first flattened hunch is less than 17% of a pitch of the teeth.

10. The metallic card wire as in claim 1, wherein the top segment comprises at least two hunches.

11. The metallic card wire as in claim 3, wherein the top segment comprises at least two flattened hunches.

12. The metallic card wire as in claim 1, wherein the front angle which is the angle of the tangent to the front segment at the tip of the tooth with the length direction of the card wire, is between 40 and 80 degrees.

13. The metallic card wire as in claim 3, wherein the front angle which is the angle of the tangent to the front segment at the tip of the tooth with the length direction of the card wire, is between 40 and 80 degrees.

14. Method of making a card wire as in claim 1, wherein the card wire is made by means of rotary punching.

15. Method of making a card wire as in claim 3, wherein the card wire is made by means of rotary punching.

\* \* \* \* \*